United States Patent [19]
Slater

[11] 3,890,079
[45] June 17, 1975

[54] AUTOMATIC MACHINE FOR BENDING AND FLARING QUANTITIES OF PLASTIC PIPE

[75] Inventor: Willard C. Slater, Miami, Fla.

[73] Assignee: Universal Plastic Pipe Bending Corporation, Miami, Fla.

[22] Filed: Nov. 13, 1972

[21] Appl. No.: 305,856

[52] U.S. Cl. ............. 425/155; 425/163; 425/384; 425/393; 425/397; 425/DIG. 218
[51] Int. Cl. ............................................. B29c 17/02
[58] Field of Search .......... 425/392, 393, 384, 395, 425/155, 163, 397, DIG. 218

[56] References Cited
UNITED STATES PATENTS

| | | | |
|---|---|---|---|
| 3,360,826 | 1/1968 | Lorang | 425/392 |
| 3,557,290 | 1/1971 | Siegfreid et al. | 425/393 X |
| 3,616,495 | 11/1971 | Lemelson | 425/155 |
| 3,753,635 | 8/1973 | Barnett | 425/392 X |

Primary Examiner—Francis S. Husar
Assistant Examiner—David B. Smith

[57] ABSTRACT

An automatic machine having a magazine for receiving plastic pipes of predetermined size and length including means for heating, die forming into elbow shape, and mandrel flaring one or both ends thereof, and automatically injecting compressed air therein for correcting aborrations and then projecting cooling water through each elbow and sequentially depositing the formed pipes in a tank of final cooling water and conveyor transferring same therefrom.

6 Claims, 20 Drawing Figures

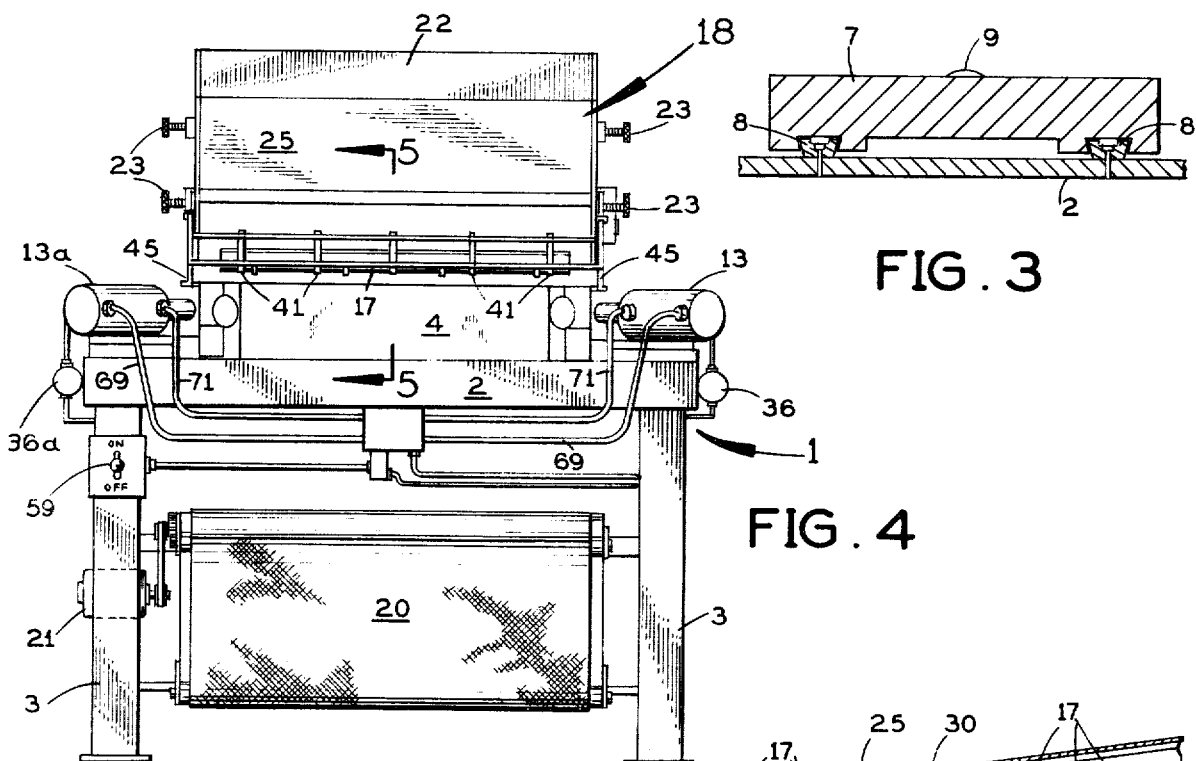
FIG. 3
FIG. 4
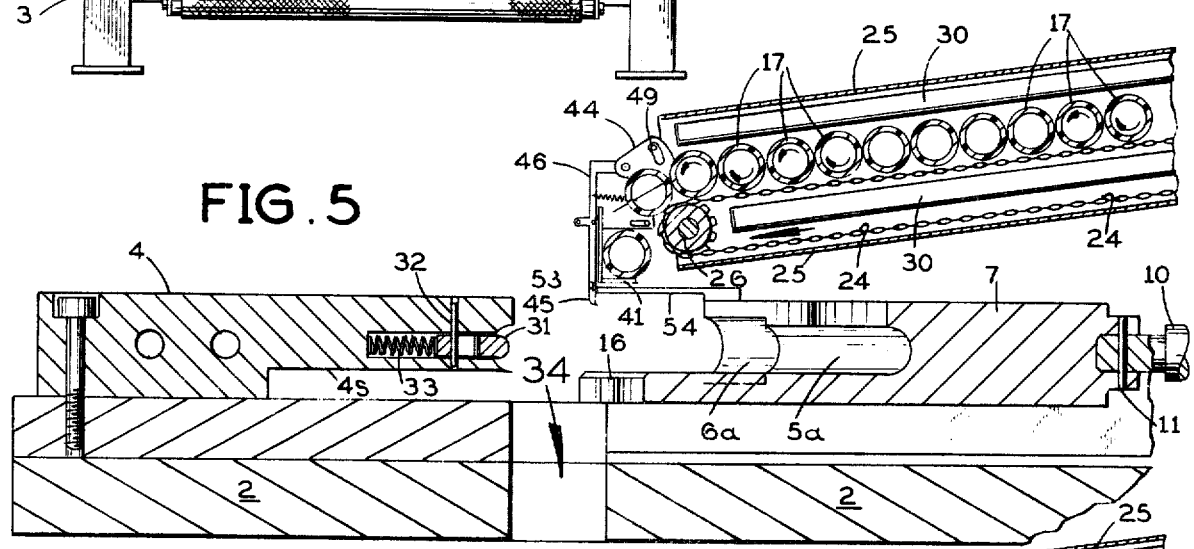
FIG. 5
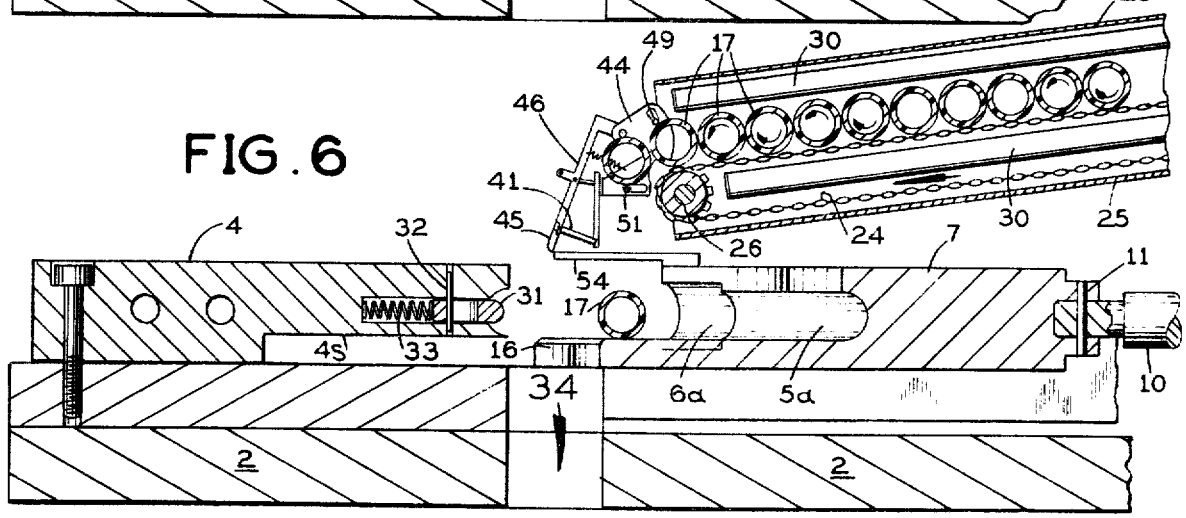
FIG. 6

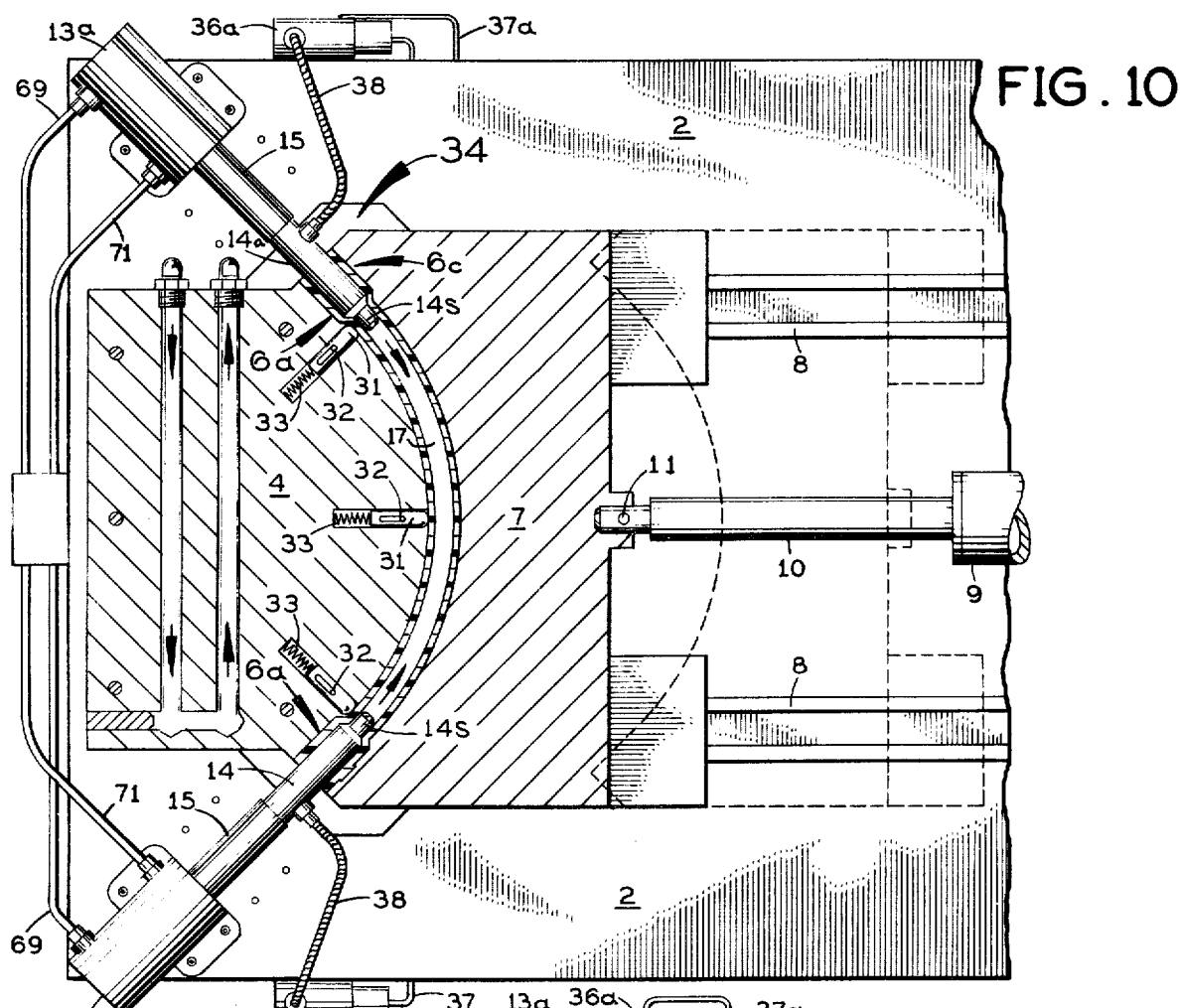
FIG. 10
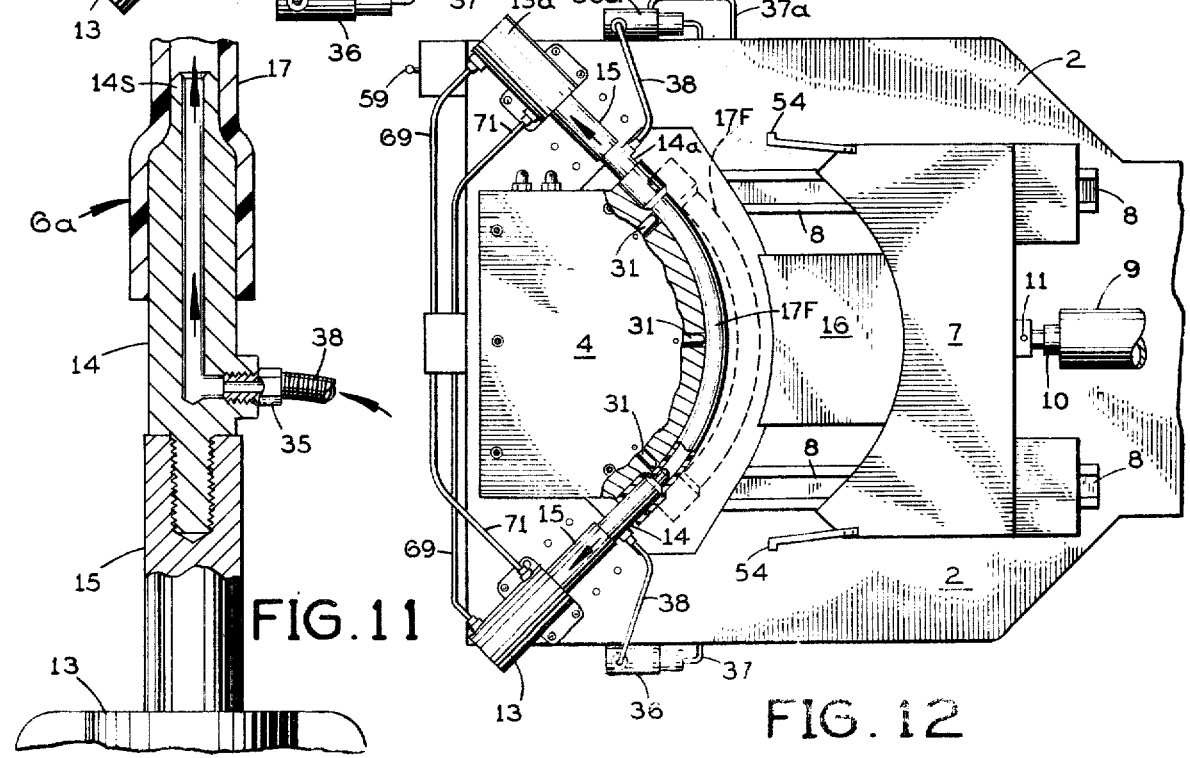
FIG. 11
FIG. 12

AUTOMATIC MACHINE FOR BENDING AND FLARING QUANTITIES OF PLASTIC PIPE

This invention relates in general to automatic machines for forming quantities of straight lengths of thermal softened plastic pipes of like length into elbow form and flaring one or both ends as coupling sockets for adhesively joining like pipes thereto.

Prior to this invention hand means were used for heating pre-cut lengths of pipe and then individually die-forming same into elbow shape on which separate couplings were required to attach like pipe to opposite ends thereof, which general process was fraught with difficulty and cost, such as imperfections in accuracy in the bending of the elbow, partial collapse of the pipe when bent, and the difficulty of bonding a separate coupling on each end thereof.

The present invention overcomes the above objections and disadvantages by the use of a machine which accurately and sequentially heats and forms, at relatively low cost, each of a quantity of pipes of equal length into an elbow shape without deformations and also expands opposite ends thereof for the elimination of added couplings when other pipe is connected thereto.

Another object of the invention is the provision of an automatic machine for sequentially heating each of a plurality of straight pipes to a predetermined flexibility and moving same between die members for forming a bend having a predetermined radius and optionally flaring opposite ends of the now formed elbow by automatically inserting means for simulating a coupling socket at one or both ends of the elbow.

Another object of the invention is the provision of subsequently applying compressed air within the elbow for preventing internal deformations and subsequently cooling the elbow into rigidity by the passage of cool water therethrough and then releasing the elbow from the die portion for descent into water for final cooling, including conveyor means for transferring the finished elbow to a predetermined area.

These and other objects and advantages in one embodiment of the invention are described and shown in the following specification and drawings, in which:

FIG. 3 is a cross sectional view taken through section line 3—3, FIG. 2.

FIG. 4 is a rear elevation of the machine shown in FIG. 1.

FIG. 5 is a cross sectional side elevation taken through section line 5—5, FIG. 4.

FIG. 6 is the same as FIG. 5 in changed position.

FIG. 10 is an enlarged plan view of the machine in partial cross section showing the mandrel formation of the flanges in opposite ends of the pipe while the latter is retained in elbow shape.

FIG. 11 is a fragmentary enlarged view of one of the mandrels for forming the coupling socket enlargement in the end of the pipe and includes the provision for first admitting compressed air to prevent deformations within the elbow and second to pass a quantity of cooling water through the elbow for chilling the pipe below flexible limits of the plastic.

FIG. 12 is a plan view showing a portion of the forming die withdrawn and the direction of withdrawl of the flange forming mandrels and the ejection of the finished elbow from the die members.

Figure 1:
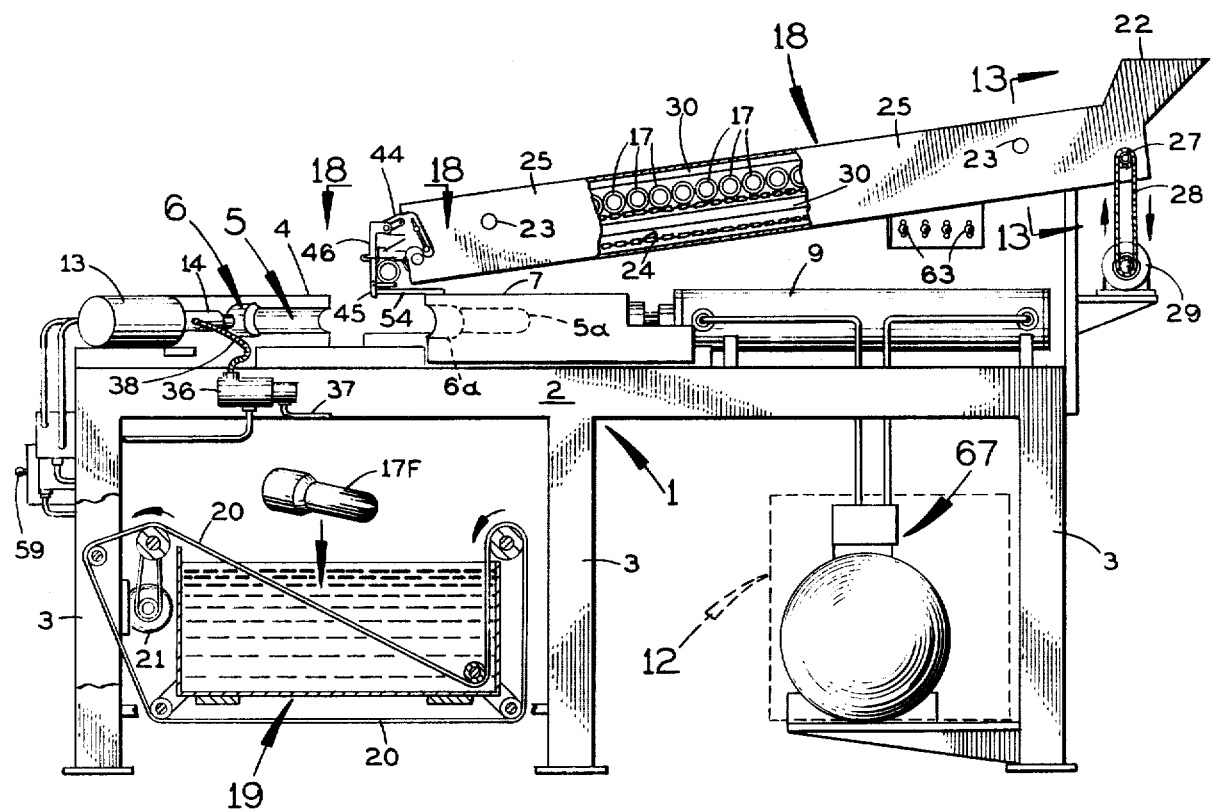
FIG. 1 is a side elevation of the machine in reduced scale with portions thereof broken away.
Figure 2:
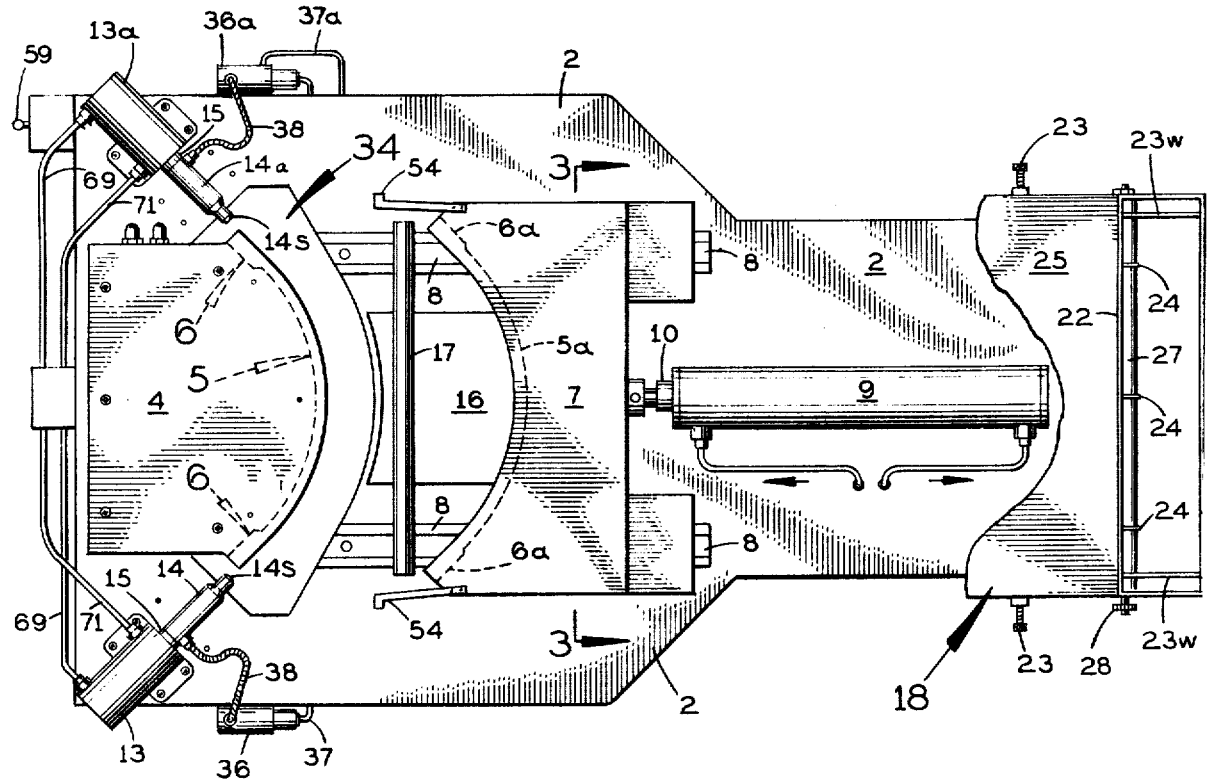
FIG. 2 is a top plan view of the machine shown in FIG. 1 with a portion thereof broken away.

Referring to FIGS. 1, 2, and 3, the entire pipe forming machine is supported on a table-like frame 1 with a top 2 supported by six legs 3.

A stationary first die member 4 of the pipe forming die assembly is secured to one end portion of the top 2 and the working end thereof has a ninety degree concave curved groove 5 therein having semi-circular cross section, except small end portions of the groove, which have short coaxial cylindrical enlargements 6—6, better shown in FIGS. 10 and 11, for forming one half of the coupling sockets for the elbow. The movable forming second die member 7 of is adapted and constructed for slidable movement on a pair of parallel spaced gibs or rails 8—8, which are secured on top 2 of the table. The forming die member 7 has a concave curve in the working end thereof containing a like semi-circular groove 5a and like cylindrical enlargements 6a at opposite ends thereof which are substantially identical to the groove 5a and like enlargements 6a—6a when the two die members 4 and 7 are mated together.

Figure 9:
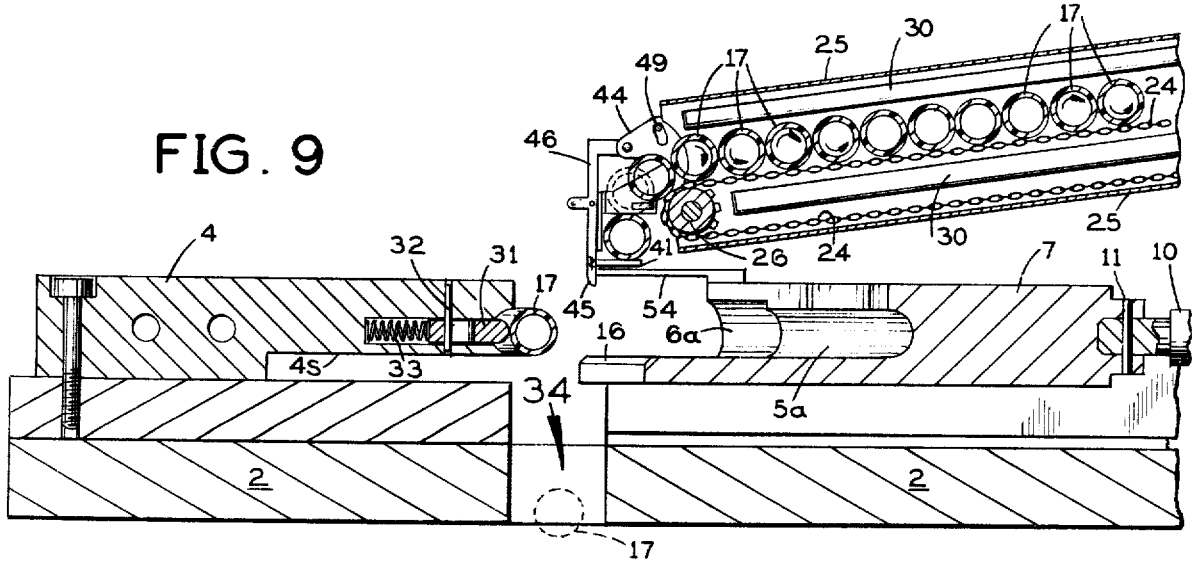
FIG. 9 is the same as FIG. 8 with the machine in elbow discharge position.

A pneumatic cylinder 9 having a conventional two-way piston, not shown, is secured to the top 2 with the end of the piston rod 10 thereof centrally secured to the rear end of the die member 7 of the die by a pin 11, shown in FIG. 9 for moving die member 7 from its open idle to its closed position mated with die member 4.

With the exception of the electric control equipment, the entire machine is operated by compressed air supplied by a well known automatic air compressor assembly 12, as illustrated secured to a suitable bracket by a pair of legs 3 under the top 2.

FIGS. 1 and 2 show a pair of air cylinders 13–13a, of which cylinder 13 is a single valve and cylinder 13a is a double acting valve, with the end of the piston rod 15 of each coaxially secured to a cylindrical and following forming mandrel 14a having a reduced cylindrical tip portion 14s, better shown in enlarged FIG. 11, with the piston rod 15 extended.

Figure 7:
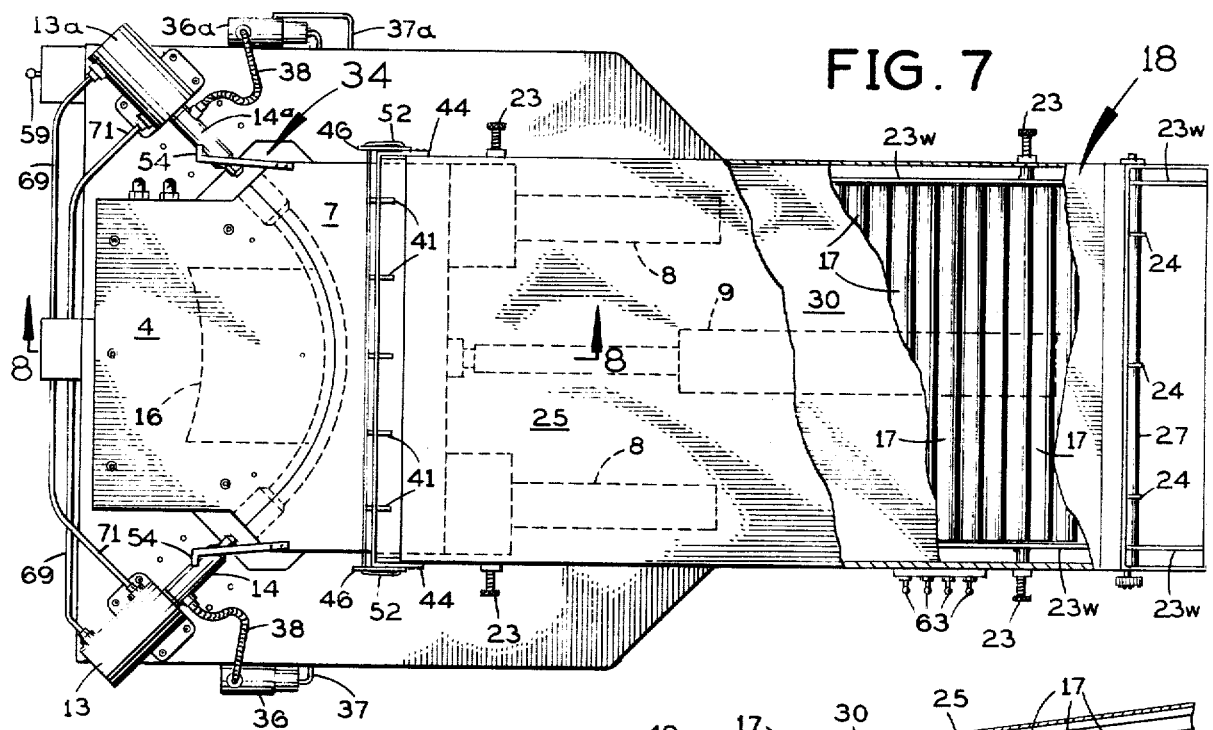
FIG. 7 is a top view of the machine shown in FIG. 1 in pipe forming position with portions thereof broken away.
Figure 8:
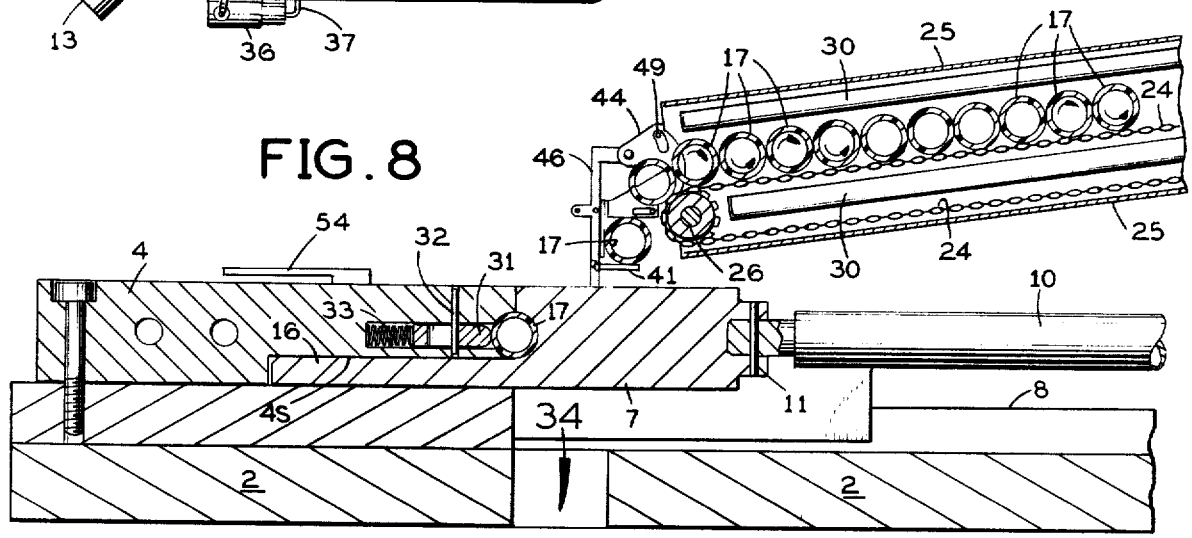
FIG. 8 is a cross sectional side elevation taken along section line 8, FIG. 7, when in elbow forming position.

It is to be noted that die member 7 has an integral guide ledge 16 which engages a like cavity on the underside of the die member 4 having an upper surface 4s for receiving and holding by gravity each pipe 17 in position prior to bending, as shown in FIG. 2, as well as precisely guiding the closure of the die members 4 and 7, better shown in FIGS. 5, 6, and 7.

An automatic pipe feeding magazine 18 for heating and sequentially releasing each of a plurality of tubes of predetermined dimensions for sequential gravity deposit upon guide 16 is supported above the top 2 of the machine, as shown in FIG. 1. The operation of the feeder assembly will be hereinafter described.

The cross sectional view, FIG. 3, shows the slidable mounting of the die member 7 slidably mounted on a pair of parallel gibs 8 by screws threaded into the top 2.

FIGS. 1 and 4 illustrate a water cooling container assembly 19 supported between a pair of legs 3—3 supplied with a quantity of water for the final cooling of the descended finished elbows 17F and subsequently transferring same from the tank and machine by a conveyor belt 20 driven by well known guide means and motivated by an electric motor 21, as shown.

Figure 13:
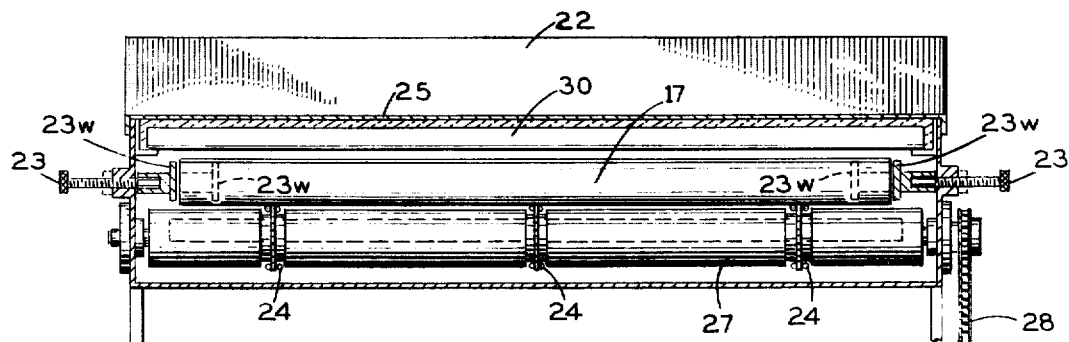
FIG. 13 is an enlarged cross sectional view taken through section line 13—13, FIG. 1, showing the adjustment of the feeding mechanism to accommodate pipes of different length.

Referring to FIGS. 1, 4, 5, and 6, the straight pipe conveyor housing 25 is provided with an entry hopper 22, shown in FIGS. 1 and 4, and four adjustment screws 23 which adjust the opposing parallel internal linear elements 23w of the feeding magazine for the lateral gravitation of the adjacent free downward movement of the pipes of predetermined length, as shown in FIG. 13.

FIGS. 1, 5, and 13 show three spaced endless chain means 24 journalled for rotation on mating sprockets along the lower portion of the side of the length of the housing 25 of the feeder assembly, which is driven by an endless electric motor 29 through a drive chain 28 on sprocket spindle 27.

The fragmentary cross sectional view of the feeder assembly is shown in FIGS. 5, 6, and 13 and indicate a pair of rectangular armored heating elements 30—30, which elements apply radiant heat to the top and bottom of all pipes 17 positioned in adjacent contact relation on conveyor chain means 24. When the foremost pipe is sufficiently heated to a predetermined temperature for proper forming, it is released by automatic dispensing means, to be hereinafter described.

FIG. 6 shows one of the pipes 17 of predetermined dimensions descended upon guide ledge 16 prior to the closing of die member 7. Three ejection plungers 31, best shown in FIGS. 6, and 10, are slidably positioned in radial bores in die member 4 normally projecting outward as shown under the restraint of pins 32 and under the compression force of each spring 33. Thus, when the die member 7 is moved from the open position shown in FIG. 2 to the closed position shown in FIG. 7, each of the three springs 33 will be compressed by the pipe against each plunger 31 until die member 7 is retracted, at which time the stored energy in springs 33 will permit the movement thereof and dislodge the now formed pipe from the die member 4 for gravity descent through an opening 34, as shown in FIGS. 6 and 9.

Since this machine is adjustable to form elbows in various diameters with or without coupling sockets in either end following a change of the dies accordingly, a die number is recommended in one of enlargements 6a in die member 7.

In order to understand the general sequence of the operation of the machine, the present description covers the detailed operations and reference will be hereinafter made to both pneumatic and electric diagrams for detailed description of the operation of all elements involved.

Referring to FIG. 10, the normally retracted mandrels 14 are energized only following the complete closure of die member 7, which forms the straight heat-softened pipe into a ninety degree elbow. At this time, each of the mandrels 14–14a will be projected by their corresponding cylinders 13 and 13a, which will move the corresponding mandrels 14 and 14a into the bore of the now formed elbow 17 and thus form a coupling socket at opposite ends of the elbow.

Figure 20:
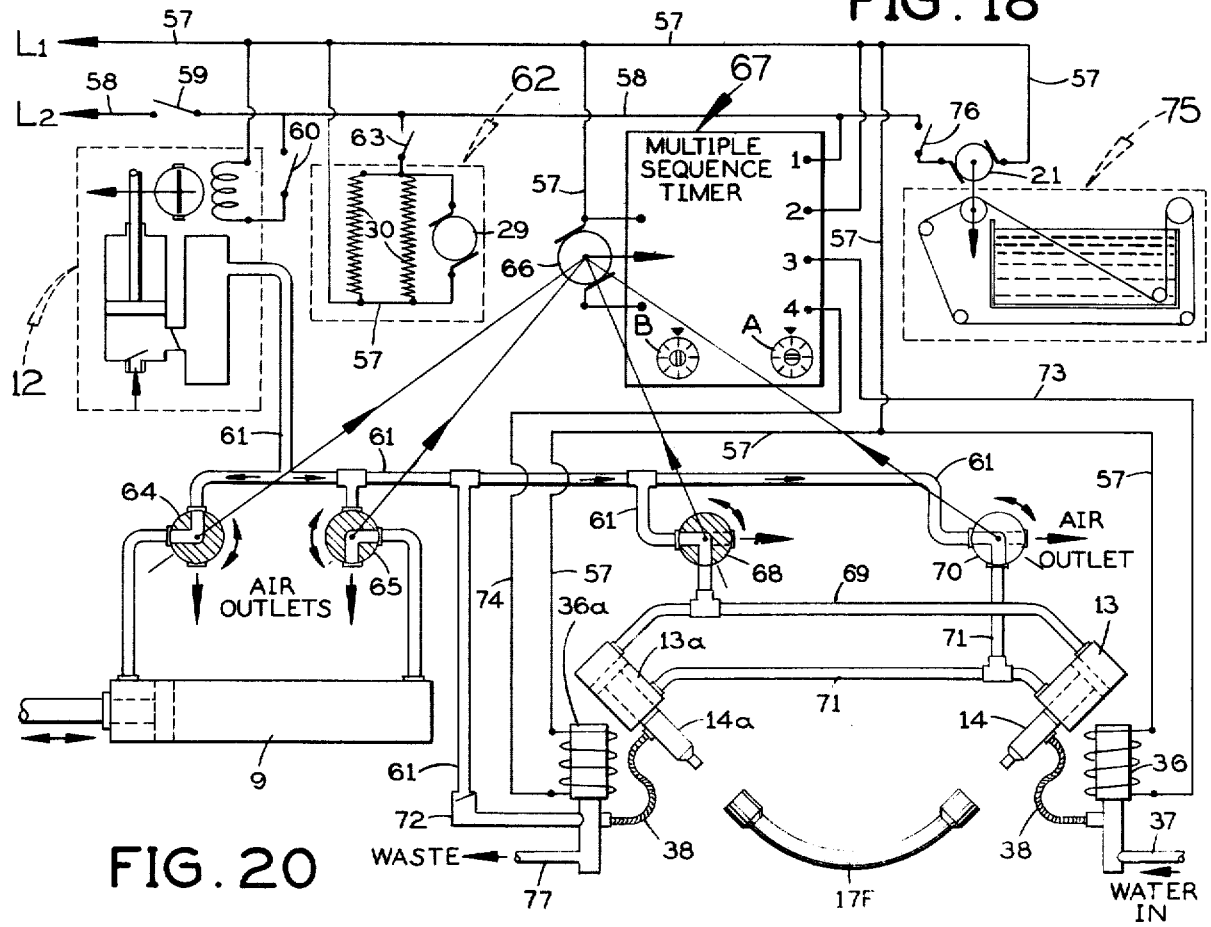
FIG. 20 is a combined schematic diagram of the electric, pneumatic and water circuit used in the machine shown in the foregoing figures.

When the coupling sockets are formed, the cylinder 13a is electrically energized and compressed air from timer valve 68 is introduced through the mandrel 14a via the coaxial bore therein and air coupling hose 38, shown in FIGS. 11 and 20. It is also apparent that at this stage the closed valve 36 controlling the flow of water in the mandrel 14 is closed by the electrical operation of valve 36. This compression operation will remove any wrinkles or abborations in the now formed still-softened plastic pipe. The air compression is then followed by a predetermined flow of cold water resulting from the electrical opening of valve 36 through the now formed elbow 17F and from mandrel 14a into valve 36a which is in its open waste position. The cylinders 13 and 13a are now reverse energized by compressed air, as shown in FIG. 20, and withdrawn from the now formed coupling sockets followed by the retraction of die member 7 to its idle position by the reverse action of cylinder 7. It is now apparent that the finished elbow will be ejected and descend by gravity through aperture 34 in the top of the frame and gravitate into the final cooling water in cooling assembly 19 and followed by the automatic transfer from the machine by the conveyor belt 20.

The pipe feeding magazine assembly 18, shown in FIG. 1, consists of a housing 25 with a loading entry hopper 22 supported above the top 2 of the table at a predetermined angle and includes three endless parallel spaced conveyor chain means 24 which are driven on an elongated shaft means 27, as previously described. A pair of rectangular armored heating elements 30, shown in FIGS. 5 and 7, are secured above and below the path of movement of the adjacent pipes respectively on the chain means 24 which gravitate in transverse contact down the slope to a sequential discharge device, to be hereinafter described. It is important to notice that the direction of the chains oppose the direction of normal gravity movement of the adjacent lengths of pipe since the contact of the chains tend to maintain rotation of the pipe for uniform heating by the heating elements when the motor 29 is energized.

Referring to FIGS. 1 and 2, an electric magnetic normally closed single water valve 36 is secured to one side of the top 2 and supplied with pressurized water to a tube 37. The coaxial bore in the mandrel 14 is connected to a normally closed valve 36 by a flexible conduit 38.

Again referring to FIG. 2, a second electro-magnetic valve 36a is connected to mandrel 14a by a second flexible conduit 38. The valve 36a is adapted and constructed to alternately supply compressed air and outflow of pressurized water from the mandrel 14a when elbow 17F is being cooled by assuming its waste position when idle. An independent water tube 37 supplies pressurized water to valve 36 and tube 37a supplies valve 36a with controlled compressed air. The detailed operation of the air and water valves will be hereinafter described.

The straight pipes 17 which are sequentially dispensed from the pipe feeding magazine 18 are sequentially responsive to each reciprocation of the die member 7 and referring to FIGS. 5 – 9, the operation will be hereinafter described.

FIGS. 1 and 7 show the alignment formation of plastic pipe 17, preferably cut from long lengths of plastic material, such as PVC or other thermoplastic material suitable for specific use. The pipes are positioned by gravity on the chain in parallel contact position when inserted in the entry hopper 22. When the motor 29 is energized by switch 42, as shown in FIG. 20, the three chain means 24 will rotate the pipe in direction shown by arrows for uniform heating by the heating elements 30, shown in FIGS. 5 and 20.

The entire pipe dispensing mechanism is supported by plates 44 adjustably secured to opposite sides of the housing 25 of the magazine, shown in FIG. 4, in which a gate 46 has a series of projections 41 secured normal to the pivoted gate 46 with the outer ends thereof pivoted in plates 44.

When the machine is in rest position the lowermost pipe to be formed will rest upon the upper sides of projections 41, as shown in FIG. 5. It is now apparent that the tripping abutment members 54 secured to the upper side of die member 7 are positioned to engage the lower end of each pawl 53, pivoted for limited movement to gate 46. The gate 46 is moved by the pawl 53 in an outward direction, as shown in FIG. 6, which will permit the lowermost pipe to descend by gravity to guide ledge 16, best shown in FIGS. 2 and 6.

Figure 14:
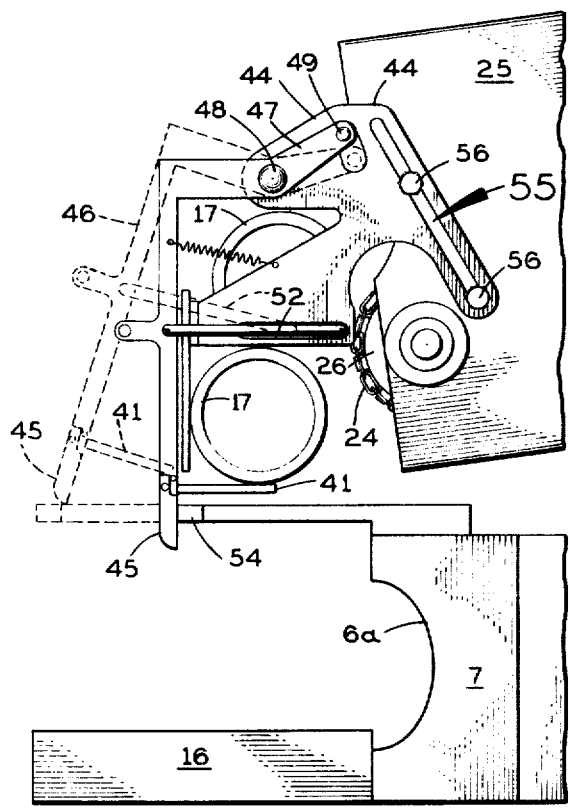
FIG. 14 is a side elevation of the pipe dispenser secured to the lower end of the multiple pipe feeding magazine, positioned for operation.
Figure 15:
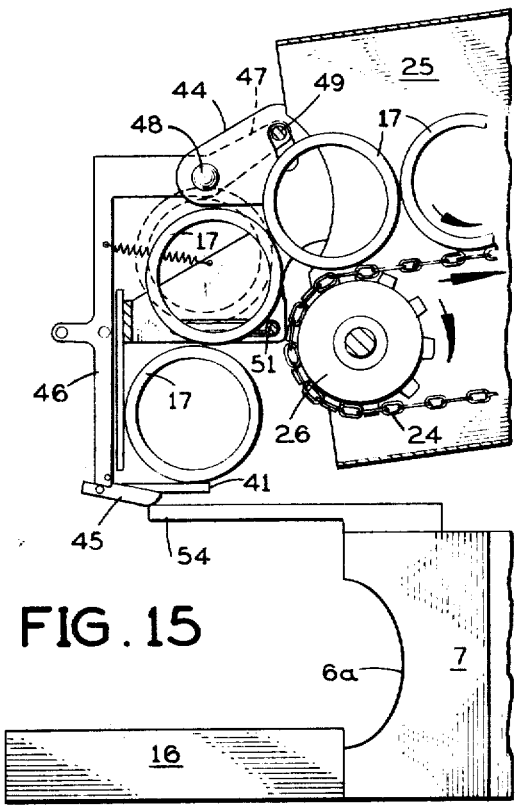
FIG. 15 is a cross sectional view of elements shown in FIG. 14 prior to the beginning of the pipe descent operation.
Figure 19:
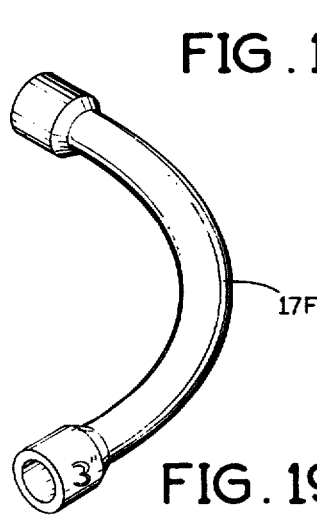
FIG. 19 is a perspective view illustrating a typical elbow formed in the machine described with an integral coupling socket at each end thereof including a die marked number illustrating the size thereof.
Figure 17:
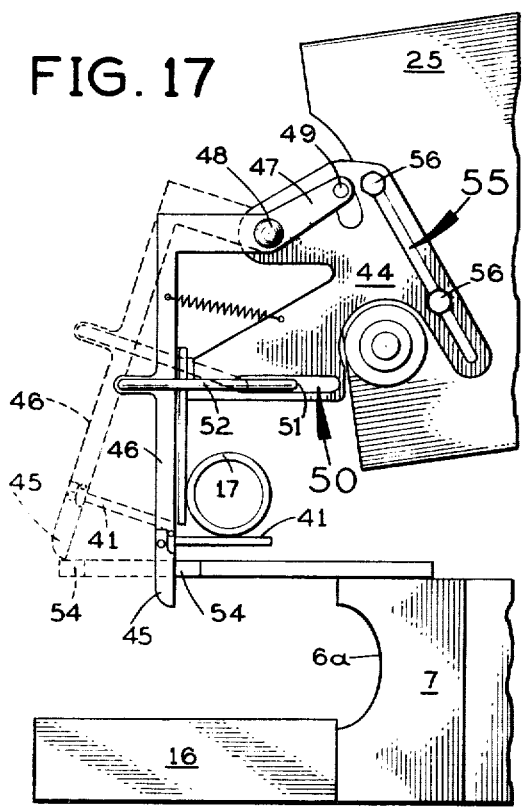
FIG. 17 illustrates the adjustment of elements for use with pipe of smaller diameter and the range of movement for the descent of the smaller pipe.
Figure 18:
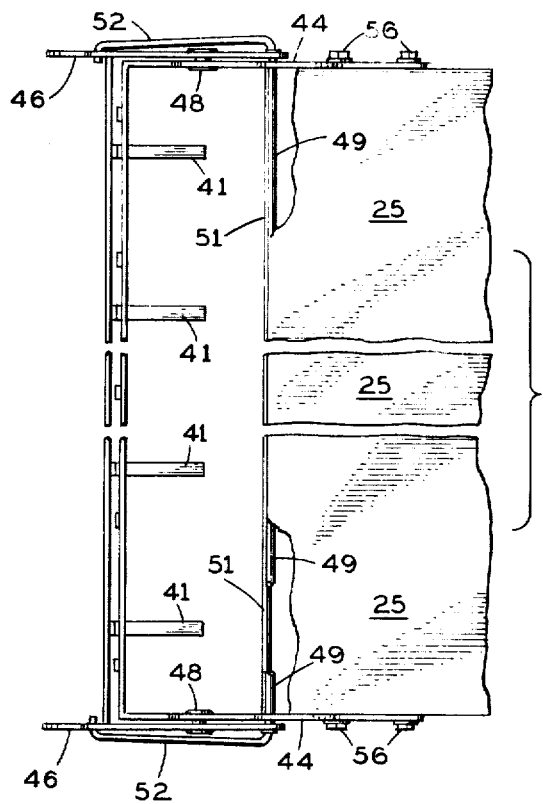
FIG. 18 is a cross sectional view taken through section line 18—18, FIG. 1.

Referring to FIGS. 14 and 17, each side of the gate 46 has an integral extension 47 pivoted about a rivet 48. The end of each lever includes a pin 49 which extends through a like clearance aperture in plates 44 for engaging opposite ends of the pipe resting on chain means 24 and preventing same from moving forward when in the full line position shown in FIG. 6. The U shaped balt 51 extending across the entire front of the magazine has both inner ends slidably positioned for reciprocation in slots 50 in opposite plates 44.

Figure 16:
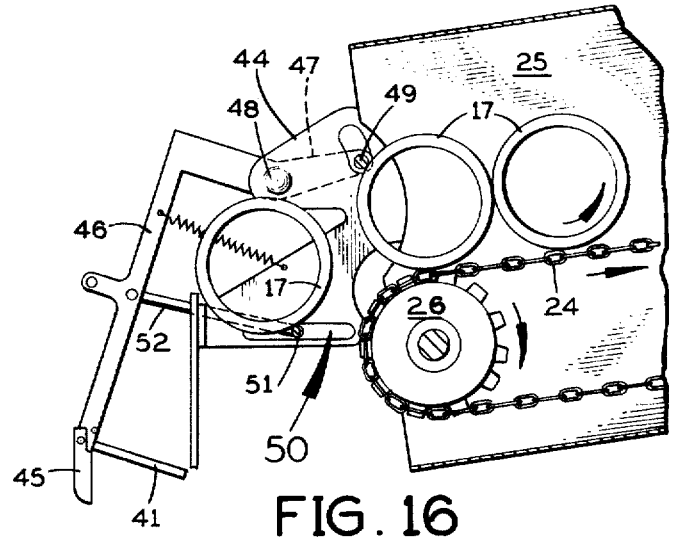
FIG. 16 illustrates the position of the elements shown in FIG. 15 in position for a sequential pipe descent.

Thus, when the gate is in its dotted position, as shown in FIG. 17, the pins 49 will hold back all pipes on the chain means 24 and the inner projecting ends of bale 51 will raise the forward pipe to a position free from the rotation of the chains and the adjacent pipe, as shown in FIGS. 6 and 16. The pivoted pawl 53s extending downward from each side of the gate 46 will trip the spaced abutment member 54 and assume a downward sloping position and permit a fixed stop to guide each pipe downward, as shown in FIG. 16, for continued operation. Thus each of the pipes placed in the magazine will be sequentially dropped onto guide 16 each time the die member 7 is reciprocated.

It is to be noted in FIG. 17 that each of the side plates 44 are provided with a slot 55 and retained by a pair of cap screws 56 which make possible an adjustment for accommodating a predetermined range of pipe sizes, to be sequentially released to appropriate die members 4 and 7 having forming grooves corresponding therewith.

A simplified version of the machine described may be hand operated by the sequential operation of a number of manual controls, however the machine described may also include elements which make it automatic, providing quantities of the straight lengths of tubing are quantity fed into the open hopper 22 of the magazine.

A particular electric, pneumatic, and water conducting schematic diagram is shown in FIG. 20 wherein conductors 57 and 58 are intended to be connected to a source of electric energy $L_1$ and $L_2$.

The electric power air compressor and reservoir therefor is illustrated in FIGS. 1 and 12, which will supply a source of air to line circuit of predetermined pressure by the closure of the master switch 59 and compressor switch 60, which latter switch may be of the pressure control variety, to supply the main air circuit connections at substantially constant pressure.

The dotted enclosure 62 includes the motor 29 and heating elements 30 in the magazine assembly 18, which motor and heating elements are energized and pre-heated by the closure of switch 63.

The cylinder 9 which is adapted to close die member 7 against fixed die member 4 is adapted to operate in opposite directions by air pressure under the control of two portions 64 and 65 of the control timer 67, subject to predetermined timed sequential rotation by motor 66 which includes a well known speed reducer and a rotary electric commutator, not shown.

A well known multiple sequence timer 67 driven by motor 66 is energized by conductors 57 and 58 and is provided with control knobs A and B for adjusting the sequential operation of valves 64, 65, 68 and 70 and also provides a separate control for the sequence of electrial operation of the valves 36 and 36a and the motor 21 when switch 76 is in closed position. Switch 60 is intended to be automatically opened when the air compressor assembly 12 has reached a certain predetermined pressure. It is now apparent that the timer 67 will control the sequence of operation of cylinder 9 by the simultaneous rotation of valves 64 and 65. It is also apparent that the timer simultaneously controls the air valves 68 and 70 for operating the mandrels 14a and 14 in timed sequence following the operation of the closure of die member 7.

It is also apparent from the diagram that the control valve 36 will be in a closed position when the air inlet to valve 36a is opened through a check valve 72 with the water outlet in closed position. This will force compressed air through conduit 38 and from mandrel 14a into the elbow and compress the inner sides thereof prior to the opening die member 7.

The timer will then operate under pre-set conditions the opening of the waste port 77 of valve 36 and the opening of the pressurized water line 37 by energizing valve 36, thus permitting cooling water to flow through mandrel 14 through the now formed elbow and from mandrel 14a through valve 36a and from the waste port 77. In this manner, the plastic material of the elbow will be chilled to rigidity and the timer will reverse actuate mandrel cylinders 13 and 13a and withdraw same from the formed coupling sockets in the elbow. Immediately following this operation, the cylinder 9 will be operated in reverse and move to its idle position by further action of the timer. Following the start of the withdrawl of die member 7 the ejection plungers 31 will be actuated by their corresponding springs 33 and eject the now finished elbow from die member 4 for gravity descent through opening 34 and into the final cooling water contained in tank 19 at which time the elbow will be conveyed from the machine to a predetermined destination by the belt 20.

It is to be noted that simple elbows may be formed without coupling sockets by providing an interchangeable mandrel having only a forming diameter corresponding to the inside diameter of the pipe used. In the event a coupling socket is required on one end only a corresponding mandrel having the diameter of the inside of the pipe may be readily attached by threading into the piston rod. It is now also apparent that coupling sockets of different size may be applied to pipes having like dimensions.

It is also apparent that elbows of different angles may be readily formed by the interchange of die members 4 and 7 with the desired corresponding arcuate grooves therein.

It is to be noted that the above described electric and pneumatic circuitry produces a satisfactory automatic operation following the closure of switches 60, 63 and 76, however many variations or different types of circuits will produce satisfactory results.

It is to be fruther noted that the pneumatic circuit may be replaced by a closed circuit hydraulic system which in certain cases would be particularly desirable where pressurized hydraulic fluid is readily available.

It is to be understood that certain modifications in construction are intended to come within the teachings and scope of the above specification.

I claim:

1. A machine for automatically and sequentially forming quantities of straight pre-heated softened thermal plastic round pipe of uniform predetermined dimensions into elbows having an integral expanded coupling at each end thereof comprising means forming a frame including a substantially horizontal top, a fixed forming die member secured to said top and having a convex arcuate end surface of predetermined curvature, said end surface having a uniform recessed convex arcuate groove of predetermined axial length and a semi-circular cross section with the radius thereof substantially equal to the radius of curvature of the outside diameter of the pipe being formed and each opposite end of said arcuate groove terminating in a coaxial semi-cylindrical cavity of predetermined length and having a second cross sectional radius substantially equal to the radius of the outside diameter of the pipe plus the double thickness of the wall of the pipe, a movable forming die member having a concave end in close mating contact with said convex end of said fixed die member and a concave second groove therein mating said convex groove in said fixed die member and a like semi-cylindrical cavity at opposite ends of said second groove mating each said semi-cylindrical cavity in said fixed die member when said movable die member is in closed mating contact with said fixed die member, said movable die member secured to said top by slidable means for movement from closed contact with said fixed die member to a predetermined idle position a spaced distance therefrom by connection to the piston rod of a dual direction first power cylinder means for moving said movable die member from said idle to said mating contact with said fixed die member and vice versa when energized from opposite ends, a pair of dual direction mandrel power cylinder means secured to said top with the axis of each piston rod thereof positioned in spaced coaxial relation to each axis of each opposite semi-cylindrical cavity in said fixed die member with the end of each said rod spaced a predetermined distance from opposite sides of said fixed die member, a cylindrical forming mandrel means secured coaxial to the end of each said piston rod of said mandrel cylinder means with a coaxial tapered outer end portion terminating in a second pilot cylinder having a chamfered end for entry into the inside diameter of said pipe when each said mandrel means is moved by each said cylinder when energized into each opposite said cylindrical cavity formed by the said semi-cylindrical cavities when said movable die member is in closed position, a coaxial bore of predetermined distance in the end of each said mandrel means with a connection to a flexible conduit for sequentially conducting pressurized air for reducing deformations in said elbow and followed by conducting pressurized cooling water in the rear portion thereof for partial rigidizing of the formed elbow prior to the reverse energizing of each said mandrel cylinder means, a pipe arresting ledge having a substantially horizontal planar upper surface of predetermined width extending outward a predetermined distance from said concave end of said movable die member with said upper surface movable in a plane in close proximity with the lower edge of said groove in said fixed die member adapted for forward movement by said movable die member to arrest each descending pre-heated pipe of predetermined length in the space between the said mating ends of said fixed die member and said movable die member when the latter is spaced from the former for the movement of said pipe into its elbow form when said movable die member is moved to its said closed position.

2. The construction recited in claim 1, wherein a power driven conveyor means is secured to said frame with a hopper at one end thereof for receiving quantities of the pipe of predetermined length in parallel relation, a conveyor means sloping downward from said hopper in proximity to said pipe arresting ledge, an endless link type conveyor means journalled at opposite ends thereof and driven at a predetermined speed by a motor means when the latter is energized for guiding the pipes toward said arresting ledges, the lower end of said conveyor means having a tripping means for simultaneously releasing the lowermost pipe on said conveyor means to descend by gravity and to prevent the downward movement of other pipes on said conveyor means, said tripping means operated by the forward movement of said movable die member when moved from its said idle position toward said fixed die member, an electric heating means secured under said conveyor means in close relation to the pipes thereon for uniformly heating and softening the pipes as each pipe is rolled downward toward the said tripping means when said heating means is energized, an electric motor adapted to rotate the moving conveyor means for successively feeding the pipes into said die member for sequential forming.

3. The construction recited in claim 1 including a spring motivated ejection means positioned within said groove in said fixed die member for automatically ejecting each of said elbows formed therein when said movable die member is moved by said first cylinder means from its said closed to its said idle position when reverse energized.

4. The construction recited in claim 1 including a clearance aperture of transverse dimensions through said top beneath and forward from the convex end of said fixed die member for permitting each of said elbows ejected from said fixed die member to gravitate downward through said aperture including an open top cooling tank positioned under said aperture for retaining cooling water for each of said elbows to receive final cooling and obtain normal rigidity upon submersion.

5. The construction recited in claim 4 wherein said tank includes a motor driven belt type second conveyor for removing each of said elbows from said tank and carrying same to a predetermined drying are when said motor is energized.

6. In a machine of the character described for sequentially forming like straight lengths of plastic pipe into elbows having an enlarged integral coupling formed at opposite ends thereof comprising a fixed die member and a movable die member having contours therein for forming each said pipe into an elbow with an enlarged cylindrical opening of predetermined length at each end thereof for the subsequent forming of an enlarged coupling at each end of said pipe while said movable die member is in its closed mating position with said fixed die member, a dual operated cylinder for moving said movable die member from a closed position to a spaced idle position when said dual cylinder is reverse operated for forming a subsequent pipe into an elbow, a cylinder operated first and a cylinder operated second like mandrel positioned for reciprocation at each opposite end of said pipe for movement into the opening of each end for forward and reverse operation of each of said cylinders for forming an enlarged coupling at each end of said elbow when said movable die member is in said closed position and retaining said formed elbow, a source of compressed air including a switch for energizing same, a driven endless link type conveyor means and an electric heater therefor energized by a second switch for conducting and heating to a predetermined softness prior to sequential release to said die members, a second conveyor means in a water filled cooling tank energized by a third switch for removing finished cooled elbows deposited therein following forming by said die members and said mandrels, an electric motor operated mechanical-electric timer means for operating an air valve means for moving said movable die member from an idle to a closed position and vice versa when operated by a said master electric switch and subsequently operating a pair of first valves for moving said mandrels into the ends of the elbow formed pipe for forming an enlarged coupling at each end opening thereof while the pipe is retained within said die members, said timer also connected to operate a pair of valves for projecting the compressed air through a bore in each said mandrel for removing deformations formed in the pipe, said timer being connected to operate a pair of water valves with one of said valves connected to a source of compressed water and adapted to inject compressed water through one of said mandrels and into said pipe and out of the opposite mandrel and an open valve to waste for the partial cooling of said elbow and said timer connected to reverse energize both mandrel cylinders and extract said mandrels from said formed couplings and also to energize the reverse action of said movable die cylinder for moving said movable die member into its said idle position and permitting the formed elbow to descend from the machine into said cooling tank.

* * * * *